United States Patent
Wienand et al.

[11] Patent Number: 5,831,512
[45] Date of Patent: Nov. 3, 1998

[54] RESISTANCE THERMOMETER

[75] Inventors: Karlheinz Wienand, Aschaffenburg; Stefan Dietmann, Haiterbach; Eva Söll, Frankfurt, all of Germany

[73] Assignee: Heraeus Sensor-Nite GmbH, Hanau, Germany

[21] Appl. No.: 721,792

[22] Filed: Sep. 26, 1996

[30] Foreign Application Priority Data

Oct. 30, 1995 [DE] Germany .................. 195 40 194.8

[51] Int. Cl.$^6$ .................................................. H01C 3/04
[52] U.S. Cl. ................ 338/25; 338/22 R; 338/22 SD
[58] Field of Search .................... 338/22 R, 22 SD, 338/25

[56] References Cited

U.S. PATENT DOCUMENTS

| | | |
|---|---|---|
| 4,028,657 | 6/1977 | Reichelt . |
| 4,050,052 | 9/1977 | Reichelt et al. . |
| 4,805,296 | 2/1989 | Jinda et al. ................ 29/620 |
| 4,954,926 | 9/1990 | Pepiin ......................... 361/304 |
| 5,124,682 | 6/1992 | Ishiguro ..................... 338/22 R |
| 5,280,264 | 1/1994 | Yajima et al. ................ 338/25 |
| 5,300,916 | 4/1994 | Ishiguro et al. ............. 338/25 |
| 5,349,322 | 9/1994 | Yajima et al. ............... 338/25 |
| 5,430,428 | 7/1995 | Gerblinger et al. .......... 338/25 |
| 5,561,411 | 10/1996 | Kuzuoka ................. 338/22 SD |
| 5,610,571 | 3/1997 | Kuzuoka .................. 338/22 R |
| 5,610,572 | 3/1997 | Yajima ..................... 338/22 R |

FOREIGN PATENT DOCUMENTS

| | | |
|---|---|---|
| 0 471 138 B1 | 12/1994 | European Pat. Off. . |
| 37 33 193 C1 | 11/1988 | Germany . |
| 40 26 061 C1 | 2/1992 | Germany . |
| 43 00 084 A1 | 7/1994 | Germany . |
| 44 15 980 A1 | 11/1995 | Germany . |
| 2 109 998 | 6/1983 | United Kingdom . |

Primary Examiner—Michael L. Gellner
Assistant Examiner—Karl Easthom
Attorney, Agent, or Firm—Panitch Schwarze Jacobs & Nadel, P.C.

[57] ABSTRACT

A resistance thermometer has a measuring resistor in the form of a resistance layer essentially made of a metal of the platinum group, preferably of platinum, laid on an electrically insulating surface of a carrier having a thermal expansion coefficient in the range 8.5 to 10.5 ppm/K range, and is provided with an electrically insulating cover layer. The carrier for the resistance layer can be constructed in the following manner: (a) as a substrate of a material containing a magnesium compound, preferably magnesium titanate; (b) as an intermediate layer mounted on a substrate, wherein the material of the substrate contains at least one magnesium compound; or (c) as an intermediate layer mounted on a substrate, wherein the substrate comprises aluminum oxide. With the resistance thermometer it is possible to attain a high long-term stability in the upper temperature range (above 500° C.).

9 Claims, 2 Drawing Sheets

RESISTANCE THERMOMETER

FIELD OF THE INVENTION

The invention concerns a resistance thermometer with a measuring resistor (thermometric resistance) in the form of a resistance layer comprising essentially a metal of the platinum group with a thickness from 0.1 to 10 μm which is situated on an electrically insulating surface of a carrier with a coefficient of thermal expansion in the range of 8.5 to 10.5 ppm/K and provided with an electrically insulating cover layer.

BACKGROUND OF THE INVENTION

A resistance thermometer with a platinum resistance layer placed on a foundation comprising an aluminum oxide carrier and a thin intermediate layer arranged upon it is known from U.S. Pat. No. 4,028,657. The intermediate layer is composed of oxides from the group of lanthanum, yttrium, cerium, titanium and iron, or of mixtures of the aforesaid metal oxides, and has the function of compensating for mismatching of heat expansion between the aluminum oxide carrier and the platinum resistance layer. It is however problematic in this connection that understoichiometric or overstoichiometric oxides lose their electrical insulating property at higher temperatures, and this leads to influences upon the measured values of the resistance thermometer.

Moreover, a process for producing an electrical measuring resistor for a resistance thermometer is known from U.S. Pat. No. 4,050,052, in which the measuring resistor on a carrier of ceramic material is a platinum thin film in the indicated form produced by sputtering, which has a predetermined temperature coefficient. In this regard, a type of ceramic is used as the carrier whose mean thermal expansion coefficient differs from that of the thermometer platinum by less that ±30%. This ceramic raw material for substrates covered by a platinum thin layer resistor for resistance thermometers produced by vapor deposition is heated in an oxygen-containing atmosphere until the substrate after heat treatment contains less than 15 ppm chromium, less than 30 ppm iron, less than 45 ppm lead and less than 70 ppm silicon in a form capable of reacting with platinum. When all the aforementioned metals are present at the same time, the sum of the impurities owing to these metals does not exceed 20 ppm, whereby the substrate, which is coated with platinum in a thickness from 0.1 to 10 μm, is heated at a temperature in the range from 1000° C. to 1400° C. for at least 60 minutes in an atmosphere containing oxygen. The substrate comprises either aluminum oxide, beryllium oxide, thorium oxide, magnesium oxide or a magnesium silicate. This substrate is exposed to a temperature in the range of 500° C. to 900° C. during coating. Aluminum oxide ceramics are preferably used as the substrate, wherein the platinum layer has a thickness from 1 to 5 μm.

The production of an electrical measuring resistor with the predetermined temperature coefficient, especially for resistance thermometers, is disclosed in DE 40 26 061, wherein a platinum thin film is vapor deposited or sputtered on a substrate upon which a preparation containing rhodium sulforesinate is applied in a screen print process and burned in, so that the rhodium penetrates evenly distributed into the platinum resistance layer. With the use of a metal substrate, the side of the substrate facing the platinum thin film has an electrically insulating intermediate layer of glass ceramic.

A resistance thermometer with a platinum measuring resistor having a thickness from 0.1 to 10 μm is known from DE 43 00 084. The resistance layer is laid on an electrically insulating surface of a carrier which has a thermal expansion coefficient in the range of 8.5 to 10.5 ppm/K through which mechanical tensions on the applied sensitive resistance layer are supposed to be avoided, so that a characteristic curve results such as with a freely-suspended measuring resistor. In this connection, the measuring resistor can be used with high exactitude as a temperature sensor in the range of −200° C. to +500° C., whereby a slightest possible difference is obtained in comparison to the predetermined expected value characteristic curve according to DIN IEC 751. The electrically insulating surface is thereby formed either through the surface of an electrically insulating substrate, or through the electrically insulating surface of a glass or ceramic layer. The use of a titanium substrate with an electrically insulating glass layer represents a preferred embodiment. Moreover, electrically insulating the metal substrate with a layer of silicon oxide, silicon nitride, aluminum oxide, titanium oxide, magnesium oxide or magnesium aluminum spinel on the surface is described.

In this regard, disadvantages are the costly process control (for example, preliminary cleaning of the metal substrates and/or burning in of the glass layer under nitrogen) during production, on the one hand, and the restriction of the maximum use temperature to 500° C., on the other hand, since impurities from an underlying metal substrate can easily reach the sensitive platinum layer through the thin intermediate layer. But even with known ceramic substrates, there exists the danger of "poisoning" the platinum layer, since impurities (for example, from the housing material) advance to the platinum layer in connection with a reducing atmosphere within a thermometer housing, and there (catalytically) enter into combinations with the platinum, so that the resistance characteristic values are strongly altered. The usefulness of such a resistance thermometer can then no longer be guaranteed.

SUMMARY OF THE INVENTION

An objective of the invention is to create a resistance thermometer which, while maintaining the advantages of the known designs, also makes possible long-term stability in the upper temperature range, that is above 500° C. The characteristic curve for platinum measuring resistors according to DIN IEC 751 should be reproduced as exactly as possible in the −200° C. to +850° C. range. Moreover, a possibility for using commercially available substrates should also be achievable.

The objective is accomplished in accordance with the invention in that a material is selected as a substrate for the platinum measuring resistor which essentially comprises magnesium titanate. This material is optimally adapted to the expansion coefficient of platinum with a mean thermal expansion coefficient of 8.9 ppm/K. The stresses which arise during heating up and cooling down are thereby minimized, so that a characteristic curve is reproduced between −200° C. and +850° C. as indicated according to DIN IEC 751. This characteristic is also reproduced in continuous applications at temperatures above 500° C. Magnesium titanate is in addition a commercially available raw material which, however, otherwise only finds application for high frequency structural members or ceramic condensers. It meets all standards (hardness, dimensions, process temperatures, etc.) with regard to finishing process parameters for the production of platinum thin film measuring resistors.

The objective is further accomplished with an intermediate layer applied between the substrate and the resistance layer. In this connection, it has proven advantageous to apply an intermediate layer of $Al_2O_3$ or MgO onto the described substrate of magnesium titanate if, for example, the surface quality of the substrate offered is not sufficient for the subsequent application of the platinum film coating technique (vapor deposition, sputtering). Furthermore, an improved adhesive strength for the resistance layer to be applied on the intermediate layer is attained. The resistance layer preferably comprises platinum.

An optimal protection of the sensitive platinum layer against impurities on the part of the support and an adaptation in thermal expansion behavior is guaranteed by these two measures (choice of the suitable substrate and, if necessary, application of an intermediate layer).

In order to keep further harmful influences away from the platinum thin film, for example owing to the materials of the outer thermometer housing, the platinum layer is provided with a cover layer. This cover layer moreover should also (just like the support for the platinum layer) lie as close as possible in thermal expansion behavior to the thermal expansion characteristics of platinum, so that a change in the characteristic value of resistance occasioned by this composite is kept low.

A borosilicate glass is advantageously used for the cover layer, which is applied in a screen printing process and burned in. The thickness of this glass cover layer lies in the range of 10 μm to 100 μm. Typically, layer thicknesses of 30 μm are attained.

In order to guarantee an especially intensive protection, a ceramic platelet with a thickness between 0.1 mm and 1 mm is applied to the platinum resistance layer and attached by means of a cold age-hardening ceramic glue or a glass solder. The borosilicate glass described can, for example, be used as the glass solder. The ceramic platelet advantageously comprises the same material as the substrate, that is magnesium titanate.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF PREFERRED EMBODIMENT

Figure 1:
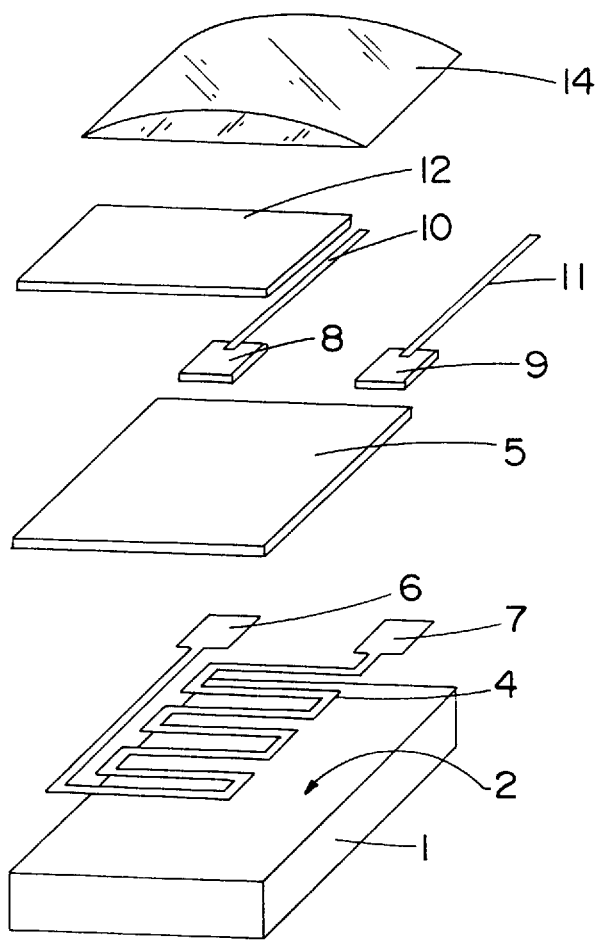
FIG. 1 depicts a measuring resistor for resistance thermometers in with which the resistance layer is directly applied to the surface of an electrically insulating substrate.

According to FIG. 1, a slab-shaped body 1 with a surface 2 which is adapted to the form of the measuring resistor 4 which is to be applied serves as a substrate. In the present embodiment, the surface 2 is constructed with roughness having a peak to valley height from 20 to 200 nm. The substrate 1 comprises magnesium titanate ($MgTiO_3$). It is, however, also possible to use aluminum oxide ($Al_2O_3$) as a material. The resistance layer 4, made of a member of the platinum group, preferably platinum, is laid on the surface 2 of the substrate 1. The resistance layer 4 is applied by cathode sputtering or vapor deposition and subsequently so structured that the form of a meander results. The comparatively sensitive (and catalytically active) platinum layer 4 is protected by a cover layer 5.

For high temperature applications, cover layer 5 is provided as a ceramic platelet with a thickness from 0.1 to 1 mm. The ceramic platelet has a thickness of 0.3 mm in this case and comprises magnesium titanate. The ceramic platelet is attached to the substrate 1 or the resistance layer 4 by means of a high-melting glass solder. With applications up to a temperature of 500° C., the cover platelet 5 can also be attached by means of a low-melting glass solder or a ceramic glue.

Instead of the ceramic platelet, the cover platelet 5 can also be constructed of a borosilicate glass which is applied in a screen printing process. The borosilicate layer has a thickness of 30 μm after burning in.

On one side of the substrate 1, contact surfaces 8, 9 are arranged in connection with the meandered resistance layer 4. The contact surfaces 8, 9 are characterized as thick layer pads, and are laid on the connection contacts 6, 7 of the resistance layer 4. The outer connection leads 10, 11 are mounted on the contact surfaces 8, 9 by welding or bonding. The connection area is electrically insulated and relieved from strain by an outer protective layer 14 of a glass ceramic material applied to the contact surfaces 8, 9 and partially to the cover layer 5. Borosilicate glass has proven itself as a glass ceramics material. Its thickness lies in the 0.5 to 3 mm range. With applications in the high temperature range (>600° C.), a cover platelet 12 is mounted in the region of the contact surfaces 8, 9 in addition to the protective layer 14. The latter takes place by means of a high-melting glass solder which can be identical with the borosilicate glass of the protective layer 14.

Figure 2:
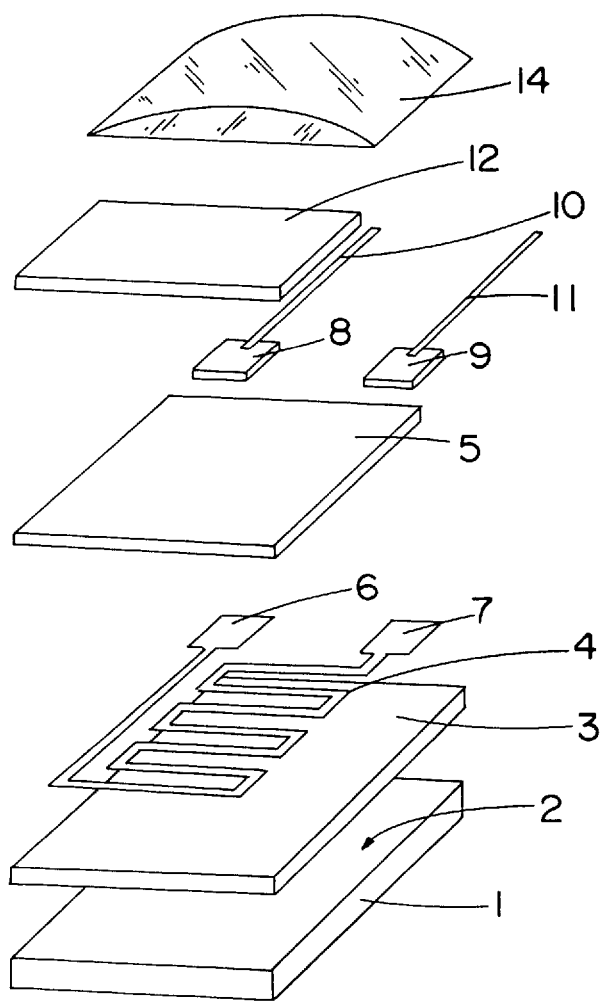
FIG. 2 shows a measuring resistor with an intermediate layer between resistance layer and substrate.

In accordance with FIG. 2, an electrically insulating intermediate layer 3 is laid on the surface 2 of the substrate 1. The intermediate layer 3 is mounted by a cathode sputtering process (sputtering). It is, however, also possible to apply it by vapor deposition or in a thick layer technique (screen printing of resinates). The intermediate layer 3 compensates for surface defects of the substrate 1 and is moreover adapted to the expansion behavior of the resistance layer 4 to be applied to it. The intermediate layer comprises aluminum oxide or. magnesium oxide. The intermediate layer serves at the same time as adhesion mediator between the substrate 1 and the resistance layer 4 to be mounted on it. With a substrate of magnesium titanate, it has proven particularly advantageous to provide aluminum oxide as an intermediate layer.

The further construction of the resistance thermometer corresponds to the explanation discussed above for the embodiment of FIG. 1 with respect to the cover layer 5, connection contacts 6, 7, contact surfaces 8, 9, connection leads 10, 11, contact surfaces-protective layer 14 and cover platelet 12.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A resistance thermometer comprising:
   an electrically insulating substrate (1) comprising magnesium titanate and having a thermal expansion coefficient of about 8.5 to about 10.5 ppm/K;
   a measuring resistor in the form of a resistance layer (4) which has a thickness of about 0.1 μm to about 10 μm and which comprises metal of the platinum group, the resistance layer (4) being applied to a surface of the electrically insulating substrate (1);

an electrically insulating cover layer (5) applied to the resistance layer (4); and an intermediate layer (3) comprising a material selected from the group consisting of aluminum oxide and magnesium oxide applied to a surface of the substrate (1) to which the resistance layer (4) is applied so as to lie between the substrate (1) and the resistance layer (4).

2. The resistance thermometer according to claim 1, wherein the cover layer (5) comprises a borosilicate glass.

3. The resistance thermometer according to claim 2, wherein the borosilicate glass has a thickness of about 10 $\mu$m to about 100 $\mu$m.

4. The resistance thermometer according to claim 3, wherein the borosilicate glass has a thermal expansion coefficient which is about the same as a thermal expansion coefficient of platinum so that a change in a characteristic value of resistance is low.

5. The resistance thermometer according to claim 4, wherein the cover layer (5) comprises a ceramic platelet of the material of the substrate (1).

6. The resistance thermometer according to claim 5, wherein the ceramic platelet has a thickness of about 0.1 to 1 mm.

7. The resistance thermometer according to claim 5, wherein the ceramic platelet is attached as a cover layer (5) to the resistance layer (4) and the substrate (1) by means of a ceramic glue or a glass solder.

8. The resistance thermometer according to claim 1, wherein the substrate (1) consists essentially of magnesium titanate and the resistance layer (4) consists essentially of a metal of the platinum group.

9. The resistance thermometer according to claim 1, wherein the resistance layer (4) consists essentially of platinum.

* * * * *